United States Patent
Tanaka et al.

(10) Patent No.: US 8,361,924 B2
(45) Date of Patent: Jan. 29, 2013

(54) FINE PARTICLES OF CORE-SHELL STRUCTURE AND FUNCTIONAL DEVICE INCORPORATED THEREWITH

(75) Inventors: Shinji Tanaka, Kanagawa (JP); Shuji Goto, Tokyo (JP); Shigetaka Tomiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/196,093

(22) Filed: Aug. 2, 2011

(65) Prior Publication Data

US 2012/0046164 A1    Feb. 23, 2012

(30) Foreign Application Priority Data

Aug. 17, 2010   (JP) ................. 2010-182053

(51) Int. Cl.
  *B01J 23/00*  (2006.01)
  *B01J 21/00*  (2006.01)
  *H01M 8/00*  (2006.01)

(52) U.S. Cl. ........ 502/313; 502/314; 502/315; 502/317; 502/318; 502/319; 502/321; 502/326; 502/330; 502/331; 502/337; 502/339; 502/344; 502/345; 502/347; 502/350; 429/400; 977/773; 977/775

(58) Field of Classification Search .......... 502/313–315, 502/317–319, 321, 326, 330, 331, 337, 339, 502/344, 345, 347, 350; 429/400; 977/773, 977/775

See application file for complete search history.

(56) References Cited

U.S. PATENT DOCUMENTS

| 6,033,783 | A | 3/2000 | Tanaka et al. |
| 6,551,960 | B1 * | 4/2003 | Laine et al. ................. 502/327 |
| 7,066,978 | B2 * | 6/2006 | Waki et al. ...................... 75/348 |
| 7,087,191 | B2 * | 8/2006 | Van Hardeveld et al. ..... 252/373 |
| 7,125,822 | B2 * | 10/2006 | Nakano et al. ................ 502/339 |
| 7,176,159 | B1 * | 2/2007 | Wheelock et al. ............ 502/303 |
| 7,381,239 | B2 * | 6/2008 | Waki et al. ....................... 75/255 |
| 7,638,459 | B2 * | 12/2009 | Rende et al. ................... 502/300 |
| 7,659,224 | B2 * | 2/2010 | Shimazaki et al. ............ 502/180 |
| 7,687,428 | B1 * | 3/2010 | Zhong et al. .................. 502/184 |
| 7,691,780 | B2 * | 4/2010 | Adzic et al. ................... 502/339 |

(Continued)

FOREIGN PATENT DOCUMENTS

| JP | HEI 9-316504 | 12/1997 |
| JP | 2002-231257 | 8/2002 |

(Continued)

OTHER PUBLICATIONS

Kitakami, O., Sato, Hisateru and Shimada, Yutaka, Size effect on the crystal phase of cobalt fine particles, Physical Review B, Dec. 1, 1997, vol. 56, No. 21, The American Physical Society, 1997.

(Continued)

*Primary Examiner* — Cam N. Nguyen
(74) *Attorney, Agent, or Firm* — K&L Gates LLP

(57) ABSTRACT

Disclosed herein is fine particles of core-shell structure, each particle being composed of a core particle which is formed from a first material and has the face-centered cubic crystal structure and a shell layer which is formed from a second material differing from the first material on the surface of the core particle and has the face-centered cubic crystal structure, the fine particles containing particles which are multiply twinned fine particles and are surrounded by the {111} crystal plane.

10 Claims, 6 Drawing Sheets

REACTIONS IN DMFC
ANODE REACTION
$CH_3OH + H_2O \rightarrow CO_2 + 6H^+ + 6e^-$
CATHODE REACTION
$(3/2)O_2 + 6H^+ + 6e^- \rightarrow 3H_2O$
OVERALL REACTION
$CH_3OH + (3/2)O_2 \rightarrow CO_2 + 2H_2O$

U.S. PATENT DOCUMENTS

| | | | |
|---|---|---|---|
| 7,704,919 B2* | 4/2010 | Adzic et al. | 502/344 |
| 7,729,931 B1* | 6/2010 | Tobin | 705/7.34 |
| 7,846,977 B2* | 12/2010 | Baijense et al. | 518/700 |
| 7,955,755 B2* | 6/2011 | McGrath et al. | 429/524 |
| 8,084,127 B2 | 12/2011 | Shimizu et al. | |
| 2002/0049132 A1* | 4/2002 | Jan et al. | 502/60 |
| 2005/0245621 A1* | 11/2005 | Baijense et al. | 518/716 |
| 2006/0116279 A1* | 6/2006 | Kogoi et al. | 502/103 |
| 2006/0118757 A1* | 6/2006 | Klimov et al. | 252/62.51 R |
| 2006/0135359 A1* | 6/2006 | Adzic et al. | 502/326 |
| 2006/0210798 A1* | 9/2006 | Burda | 428/402 |
| 2007/0031722 A1* | 2/2007 | Adzic et al. | 429/44 |
| 2007/0105005 A1* | 5/2007 | Tolmachev | 429/44 |
| 2007/0128439 A1 | 6/2007 | Kim et al. | |
| 2008/0220296 A1* | 9/2008 | Eichhorn et al. | 429/17 |
| 2009/0209415 A1* | 8/2009 | Kayama et al. | 502/303 |
| 2009/0269269 A1* | 10/2009 | White et al. | 423/437.2 |
| 2009/0297924 A9* | 12/2009 | Shimazaki et al. | 429/44 |
| 2010/0009300 A1* | 1/2010 | Fujita et al. | 430/568 |
| 2010/0062929 A1* | 3/2010 | Virkar | 502/304 |
| 2010/0092841 A1 | 4/2010 | Lopez et al. | |
| 2010/0143821 A1* | 6/2010 | McGrath et al. | 429/483 |
| 2010/0158791 A1* | 6/2010 | Hampden-Smith et al. | 423/648.1 |
| 2010/0167175 A1* | 7/2010 | Dopp et al. | 429/516 |
| 2010/0188732 A1* | 7/2010 | Akashi et al. | 359/296 |
| 2010/0189615 A1* | 7/2010 | Gramiccioni | 423/213.2 |
| 2010/0197490 A1* | 8/2010 | Adzic et al. | 502/326 |
| 2010/0216632 A1* | 8/2010 | Adzic et al. | 502/101 |
| 2010/0249448 A1* | 9/2010 | Suzuki et al. | 560/208 |
| 2010/0285303 A1* | 11/2010 | Wu | 428/323 |
| 2010/0285304 A1* | 11/2010 | Wu | 428/323 |
| 2011/0086295 A1* | 4/2011 | Lopez et al. | 429/524 |
| 2011/0090497 A1* | 4/2011 | Heck et al. | 356/301 |
| 2011/0120100 A1* | 5/2011 | Yin et al. | 60/295 |
| 2011/0129763 A1* | 6/2011 | Lee et al. | 429/532 |
| 2011/0143913 A1* | 6/2011 | Yang et al. | 502/1 |
| 2011/0200915 A1* | 8/2011 | Goto et al. | 429/524 |
| 2011/0223096 A1* | 9/2011 | Wolf et al. | 423/507 |
| 2011/0245068 A1* | 10/2011 | Stamenkovic et al. | 502/101 |

FOREIGN PATENT DOCUMENTS

| | | |
|---|---|---|
| JP | 2008-034216 | 2/2008 |
| JP | 2008-208418 | 9/2008 |
| JP | 2009-519374 | 5/2009 |
| JP | 2010-501345 | 1/2010 |
| JP | 2010-092725 | 4/2010 |

OTHER PUBLICATIONS

Iijima, Sumio and Ichihashi, Toshinari, Structural Instability of Ultrafine Particles of Metals, Physical Review Letters, Feb. 10, 1986, vol. 56, No. 6, The American Physical Society, 1986.

* cited by examiner

F I G. 1
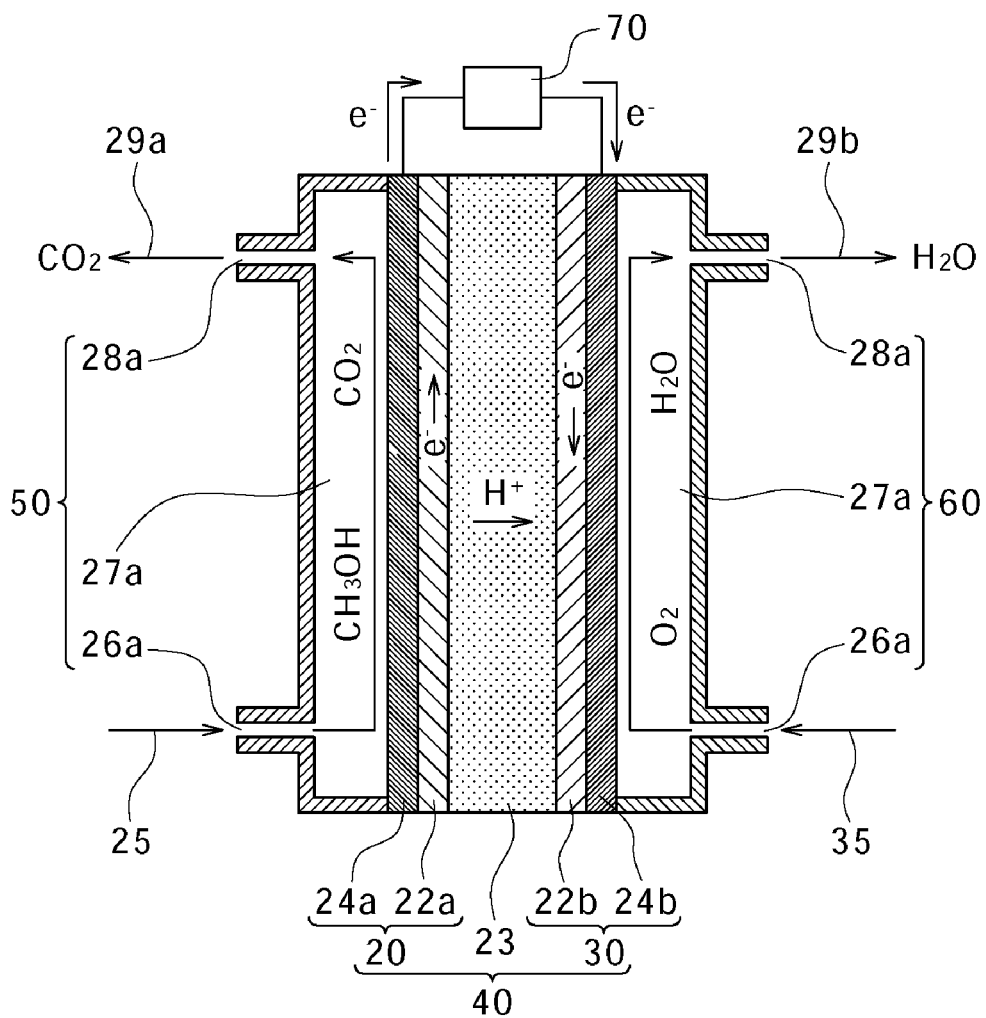
REACTIONS IN DMFC
ANODE REACTION
$CH_3OH + H_2O \rightarrow CO_2 + 6H^+ + 6e^-$
CATHODE REACTION
$(3/2)O_2 + 6H^+ + 6e^- \rightarrow 3H_2O$
OVERALL REACTION
$CH_3OH + (3/2)O_2 \rightarrow CO_2 + 2H_2O$

SCHEMATIC DIAGRAM

SCHEMATIC DIAGRAM

F I G . 5
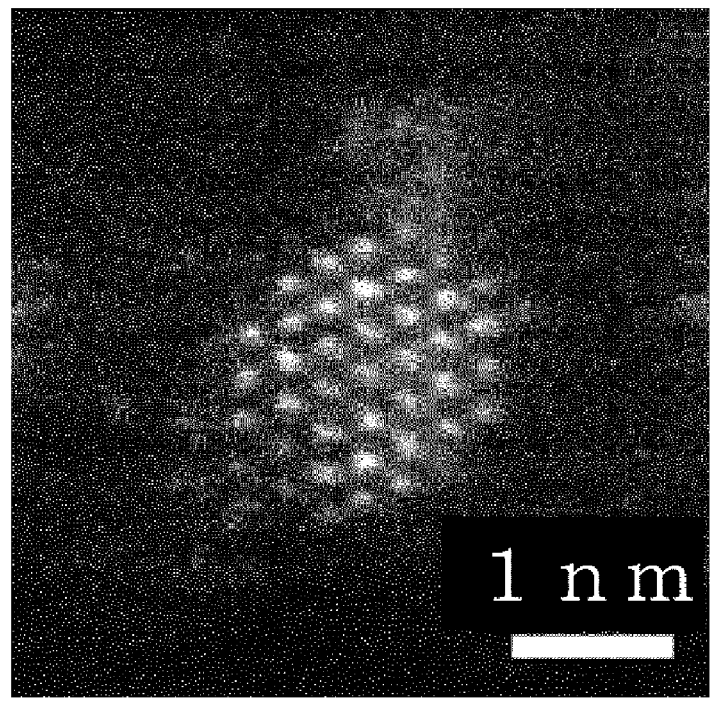
F I G . 6
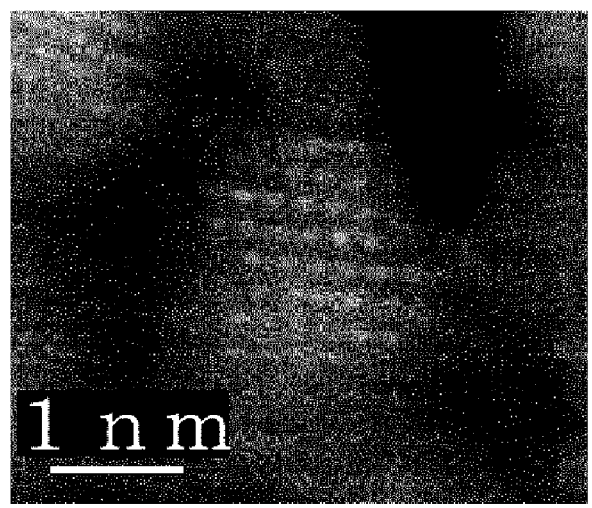

FINE PARTICLES OF CORE-SHELL STRUCTURE AND FUNCTIONAL DEVICE INCORPORATED THEREWITH

CROSS REFERENCES TO RELATED APPLICATIONS

The present application claims priority to Japanese Priority Patent Application JP 2010-182053 filed in the Japan Patent Office on Aug. 17, 2010, the entire content of which is hereby incorporated by reference.

BACKGROUND

The present application relates to fine particles of core-shell structure, each composed of a metal core particle and a shell layer, and also to a functional device incorporated therewith.

Among fuel cells are PEFC (polymer electrolyte fuel cell) and DMFC (direct methanol fuel cell) capable of converting chemical energy into electric energy through electrochemical oxidation of fuels such as hydrogen and methanol with oxygen or air. They are attracting attention because of their high energy efficiency and low environmental loads.

The fuel cell usually includes a plurality of unit cells placed one over another, each cell being constructed of a membrane-electrode assembly and separators holding it between them. Each separator has a gas passage for fuel gas or oxidizing gas. The unit cell is composed of an anode (fuel electrode or negative electrode), a cathode (oxidizer electrode or positive electrode), and a proton-conductive polymer electrolyte membrane held between them.

The electrode of the fuel cell is incorporated with a catalyst in the form of particles of noble metal of platinum group, such as platinum (Pt). The catalyst of noble metal accounts for a large portion of the production cost of fuel cells because noble metal such as platinum is an expensive material. This is a hindrance to the cost reduction and wide diffusion of fuel cells. To cope with this situation, it is technically important to contrive a new catalyst which needs less or no noble metal. To this end, extensive research and development are under way.

There are several ways of reducing the amount of platinum for the catalyst: one by reducing the size and increasing the surface area of platinum particles, one by incorporating platinum with other metals, one by alloying platinum with other metals, and one by replacing the platinum catalyst by a non-platinum catalyst.

One of solutions proposed so far to the foregoing technical problem is a catalyst in the form of fine particles of core-shell structure. Each particle includes a core particle and a shell layer of platinum atoms covering it. This idea stems from the fact that platinum atoms contributing to the catalytic action are those exposing themselves from the outermost surface of the catalyst particles and not those existing inside the catalyst particles. (See Patent Documents 1 to 5.)

Japanese Patent Laid-open No. 2002-231257 (paragraph 0006) (hereinafter referred to as Patent Document 1), which is entitled "Electrode catalyst for fuel cells and method for production thereof," describes as follows.

"The electrode catalyst according to the application includes ruthenium particles whose surface is partly covered with a platinum layer. This structure reduces the amount of the platinum which exists inside the catalyst particles and does not contribute to reactions, and it also permits platinum atoms involved in reactions to be held on the surface of the particles. The electrode catalyst is particularly effective as the anode catalyst. Incidentally, the ruthenium particles should be left partly uncovered because they cannot oxidize carbon monoxide when entirely covered with platinum."

Japanese Patent Laid-open No. 2008-34216 (paragraphs 0007 to 0013, paragraph 0029, FIG. 5) (hereinafter referred to as Patent Document 2), which is entitled "Electrode catalyst for fuel cell," describes as follows.

"The electrode catalyst for fuel cell according to the first embodiment of the application is composed of a conductive carrier and a metal catalyst supported thereon, wherein the metal catalyst has surface parts each including 300 to 1300 platinum atoms joining together side by side to form a flat surface."

Patent Document 2, which is entitled "Electrode catalyst for fuel cell," describes as follows.

"The electrode catalyst for fuel cell according to the third embodiment of the application is the same one as defined in the first or second embodiment of the application which is characterized in that the surface of the metal catalyst has only the (111) plane."

Patent Document 2, which is entitled "Electrode catalyst for fuel cell," describes as follows.

"The electrode catalyst for fuel cell according to the fourth embodiment of the application is composed of a conductive carrier and a metal catalyst supported thereon, wherein the metal catalyst has surface parts each including 140 to 4000 platinum atoms joining together side by side to form a surface of spherical cap."

Patent Document 2, which is entitled "Electrode catalyst for fuel cell," describes as follows.

"The electrode catalyst for fuel cell according to the fifth embodiment of the application is the same one as defined in the first embodiment of the application which is characterized in that the metal catalyst has the center for the surface of spherical cap composed of the atoms of at least one species of Pd, Rh, Os, Ru, Ir, and transition metals which join together side by side and is composed of more than 500 atoms in total."

Patent Document 2, which is entitled "Electrode catalyst for fuel cell," describes as follows.

"The electrode catalyst for fuel cell according to the sixth embodiment of the application is the same one as defined in the fourth or fifth embodiment of the application which is characterized in that the surface of the metal catalyst is dominated by the (111) plane than the (100) plane."

Patent Document 2 describes the electrode catalyst for fuel cell pertaining to the embodiment thereof with reference to FIG. 5 attached thereto, as quoted below.

"The electrode catalyst 20 for fuel cell is composed of the conductive carrier 21 of carbonaceous material and the metal catalyst 22 supported thereon. The conductive carrier 21 takes on a spherical shape. The metal catalyst 22 is composed of 140 to 4000 platinum atoms joining together side by side to form a monoatomic layer as the outer surface of the spherical cap 22a. The metal catalyst also has, inside the outer surface 22a, the inner surface of spherical cap composed of atoms of at least one species selected from Pd, Rh, Os, Ru, Ir, and transition metal (such as Cr, Mn, Fe, Co, Ni, Cu, and Zn). The spherical cap has the center 22b. The metal catalyst 22 is composed of more than 500 atoms and the outer surface 22a thereof is dominated by the (111) plane than the (100) plane."

JP-T-2009-519374 (paragraph 0008, paragraph 0013) (hereinafter referred to as Patent Document 3), which is entitled "Nanoparticles of core-shell structure and method for production thereof," describes as follows.

The application provides nanoparticles of core-shell structure, each including (a) a nanoparticle core and (b) a shell of crystalline substance formed thereon, the nanoparticle core being formed from a substance selected from metals belonging to Groups 3 to 15 of the periodic table, metalloid, lanthanide metals, actinide metals, and alloys and semiconductor compounds composed of at least two species of these elements. Any nanoparticle of metal or semiconductor to be used as the core is regarded as equivalent to that defined in the application disclosed in Patent Document 3 so long as it has the crystalline structure for epitaxial growth to form the shell.

JP-T-2010-501345 (paragraphs 0022 to 0031) (hereinafter referred to as Patent Document 4), which is entitled "Catalyst particles of core-shell structure, with the core being made of metal or ceramic, and method for production thereof," describes as follows.

The catalyst particles according to the application disclosed in Patent Document 4 have the core-shell structure which exhibits the characteristic surface properties of noble metal (preferably platinum) in the form of polycrystalline bulk. Therefore, the catalyst particles of core-shell structure is characterized in that the shell is large enough for noble metal (such as platinum) constituting it in the form of polycrystalline bulk to exhibit its characteristic properties and the core does not contain the noble metal that constitutes the shell.

Each catalyst particle should have an average diameter ($d_{core+shell}$) ranging from 20 to 100 nm, preferably 20 to 50 nm, and more preferably 20 to 40 nm.

Each catalyst particle should have a shell thickness ($t_{shell}$) ranging from about 1 to 20 nm, preferably about 1 to 10 nm, more preferably about 1 to 8 nm, and most desirably 1 to 3 nm. In addition, the shell of the particle should have a platinum layer with a thickness of at least three atoms. Any shell formed from platinum alloy should contain platinum atoms in combination with the atoms of the alloying element such that all the atoms constitute the shell layer with a thickness of at least three atoms. Any platinum layer thinner than specified above, especially a monoatomic platinum layer, does not contribute to specific activity.

Japanese Patent Laid-open No. 2010-92725 (paragraph 0011, paragraph 0013, paragraph 0023) (hereinafter referred to as Patent Document 5), which is entitled "Catalyst for fuel cell and method for production thereof, carbon particles carrying catalyst for fuel cell, and membrane-electrode assembly and fuel cell," describes as follows.

The application disclosed in Patent Document 5 is concerned with a catalyst of core-shell structure for fuel cell, with the core being a fine particle of gold or alloy thereof and the shell being formed from platinum or alloy thereof. The foregoing catalyst for fuel cell can be applied to the catalyst layer of the positive electrode of the membrane-electrode assembly constituting the fuel cell. It imparts good durability to the fuel cell.

In order that the foregoing effect is produced, the shell layer of platinum or alloy thereof should have a thickness smaller than 2 nm. Such a small thickness permits the strain in the interface between the gold core and the platinum shell to propagate to the surface layer of the shell. The result is that the action to raise the ionizing potential due to tensile stress easily develops on the surface of the platinum shell layer. In addition, the shell layer may be made as thin as a monoatomic layer of platinum. On the other hand, the gold core should preferably be entirely covered with the platinum shell layer because platinum atoms coexisting with gold atoms in the surface of the nanoparticle catalyst adversely affect catalyst durability.

Japanese Patent Laid-open No. Hei 9-316504 (paragraphs 0009 to 0010) (hereinafter referred to as Patent Document 6), which is entitled "Aluminum superfine particles," describes aluminum superfine particles, each being an aluminum multiply twinned particle in the form of pentagonal decahedron.

Japanese Patent Laid-open No. 2008-208418 (paragraphs 0007 to 0009) (hereinafter referred to as Patent Document 7), which is entitled "Molybdenum or tungsten particles or membrane composed of the particles and method for production thereof," describes molybdenum or tungsten particles which have the crystal structure of face-centered cubic lattice (fcc) and which are thermodynamically stable or quasi-stable particles with a large particle diameter.

In addition, various researches on metal superfine particles are under way. For example, S. Iijima et al., "Structure Instability of Ultrafine Particles of Metals," Phys. Rev. Lett., 56, 616-619 (1986) (FIG. 1 to FIG. 3) (hereinafter referred to as Non-Patent Document 1) reports the dynamic behavior of metal superfine particles observed under a high-resolution electron microscope, and O. Kitakami et al., "Size effect on the crystal phase of cobalt fine particles," Phys. Rev. B, 56, 13849-13854 (1997) (Experiment, Results and Discussion) (hereinafter referred to as Non-Patent Document 2) reports the effect of particle size on the crystal phase of cobalt superfine particles.

SUMMARY

In order to reduce the amount of platinum in the catalyst electrode layer of the fuel cell, comprehensive researches have been conducted on fine particles of core-shell structure, each including a core particle of non-platinum element and a shell layer of platinum.

However, the fine particles of core-shell structure which is applied to the catalyst electrode layer are not effective in cost reduction despite the reduced amount of platinum used. This prevents the full-scale diffusion of fuel cells. Therefore, it is important to reduce further the amount of platinum used or to improve the catalytic activity so that the catalyst produces a better effect with the same amount of platinum used.

One way to improve the catalytic activity is by increasing the number of platinum atoms contributing to the catalytic activity among the total platinum atoms used to form the catalyst electrode layer. The number of platinum atoms contributing to the catalytic activity means the number of platinum atoms exposing themselves on the surface of the catalyst particles. For improvement in catalytic activity, it is necessary to increase the surface density of platinum atoms forming the surface of catalyst particles.

The surface density of platinum atoms on the surface of catalyst fine particles is higher in the case where the surface of catalyst fine particles is crystalline than in the case where the surface of catalyst fine particles is amorphous. In other words, the surface density is high on the crystal plane with regularly arranged atoms. Moreover, in the case where the surface of catalyst fine particles is crystalline, the {111} plane of the crystal of face-centered cubic (fcc) structure is the closest packed plane in which atoms are most densely packed rather than the plane of the crystal of body-centered cubic (bcc) structure or hexagonal close packed (hcp) structure or rather than the crystal plane except for the {111} plane of the crystal of face-centered cubic (fcc) structure.

Therefore, fine particles are most suitable for the catalyst if each of them is surrounded by the {111} plane of the crystal of face-centered cubic (fcc) structure and hence has the {111} plane on the surface. Such a particle has a high ratio of atoms most contributing to the catalytic activity. That is, the fine particles of core-shell structure which have the shell layer composed of platinum atoms are most desirable for the catalyst if they are formed in such a way that the shell layer of platinum atoms constitutes the {111} plane of the crystal of face-centered cubic (fcc) structure and covers the surface of the core particle.

Incidentally, Patent Documents 1, 4, and 5, which are concerned with fine particles of core-shell structure, mention nothing about the crystallinity of fine particles. On the other hand, they mention fine particles of core-shell structure, each having the core of ruthenium atoms. Unfortunately, the shell layer of platinum, which is formed on the core particle, does not have a densely packed surface, because ruthenium which takes on the hexagonal close packed (hcp) structure at normal temperature and normal pressure differs in crystal structure from platinum which takes on the face-centered cubic (fcc) structure at normal temperature and normal pressure.

Patent Document 3 describes a method of forming the shell layer for fine particles of core-shell structure. According to this method, the shell layer is formed by epitaxial growth on the surface of the core particle, so that the resulting nanoparticle has a crystalline shell layer. However, the shell layer is formed from metal oxide but not from noble metal such as platinum.

In production of fine particles of core-shell structure, the core particle may be formed from a material that does not take on the face-centered cubic (fcc) structure and the shell layer may be formed from a material that permits epitaxial growth by matching with the crystal lattice of the core particle. In this case, the shell layer takes on the crystal structure other than the face-centered cubic (fcc) structure and hence the {111} crystal plane of face-centered cubic (fcc) structure cannot be formed which is the closest packed plane of the fine particles.

The present application was completed to address the above-mentioned problem and it is desired to provide fine particles of core-shell structure and a functional device incorporated therewith, the fine particles contributing to reduction of the amount of platinum required and to improvement in the catalytic activity.

The first embodiment resides in fine particles of core-shell structure, each particle being composed of a core particle which is formed from a first material (such as ruthenium in the embodiment mentioned later) and has the face-centered cubic crystal structure and a shell layer which is formed from a second material (such as platinum in the embodiment mentioned later) differing from the first material on the surface of the core particle and has the face-centered cubic crystal structure, the fine particles containing particles which are multiply twinned fine particles and are surrounded by the {111} crystal plane.

The second embodiment resides in a functional device incorporated with the fine particles of core-shell structure.

According to the present application, in the fine particles of core-shell structure, each particle is composed of a core particle which is formed from a first material and has the face-centered cubic crystal structure and a shell layer which is formed from a second material differing from the first material on the surface of the core particle and has the face-centered cubic crystal structure, the fine particles containing particles which are multiply twinned fine particles and are surrounded by the {111} crystal plane. Therefore, the fine particles of core-shell structure contribute to reduction of the amount of platinum required and to improvement in the catalytic activity.

According to the present application, the functional device is incorporated with the fine particles of core-shell structure mentioned above. Therefore, it contributes to reduction of the amount of platinum required and to improvement in the catalytic activity.

Additional features and advantages are described herein, and will be apparent from the following Detailed Description and the figures.

BRIEF DESCRIPTION OF THE FIGURES

FIG. 1 is a sectional view illustrating the structure of the DMFC pertaining to an embodiment;

FIG. 5 is a high-resolution HAADF-STEM image of the W core fine particle, as above;

FIG. 6 is a high-resolution HAADF-STEM image of the Mo core fine particle, as above;

DETAILED DESCRIPTION

Figure 2:
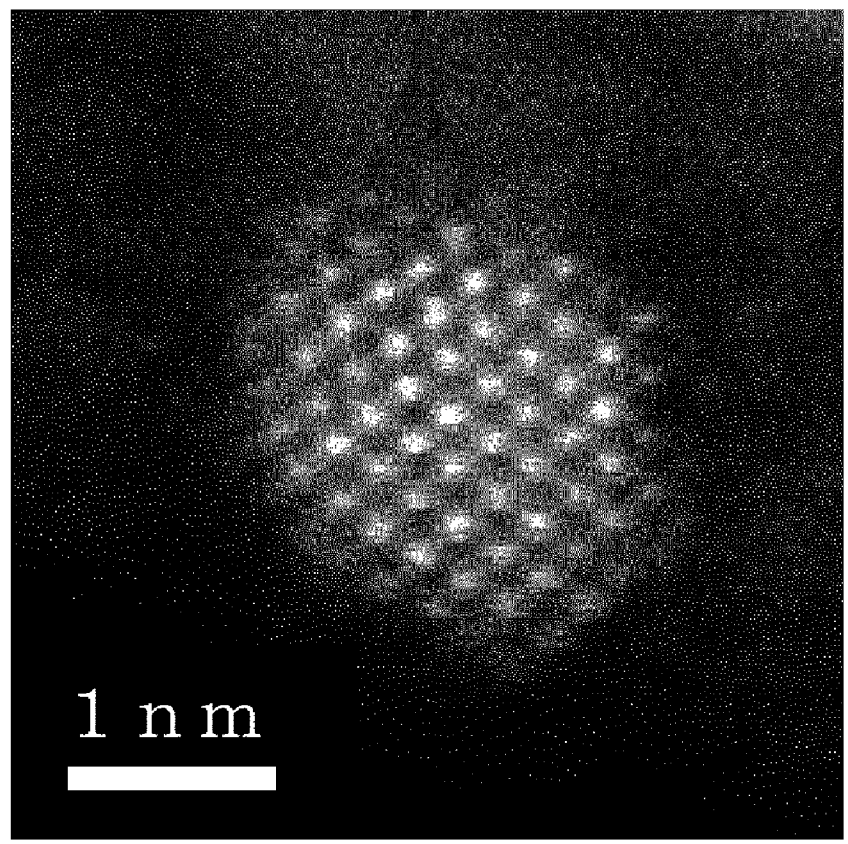
FIG. 2 is a high-resolution HAADF-STEM (high-angle annular dark-filed scanning transmission electron microscopy) image of the fine particle of PtRu core-shell structure pertaining to an example.
Figure 2:
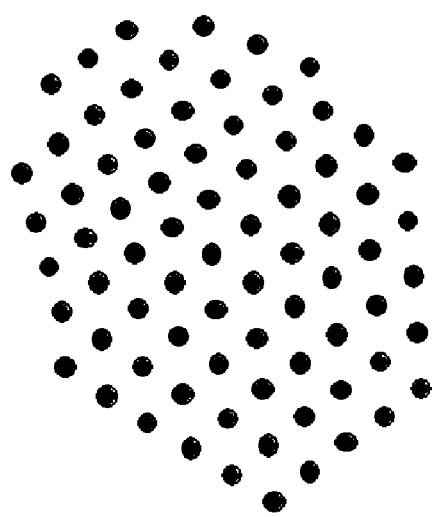

Embodiments of the present application will be described below in detail with reference to the drawings.

According to the present application, the fine particles of core-shell structure should be formed such that the core particle has an average diameter no smaller than 0.8 nm and no larger than 5 nm.

The core particle should preferably have an average diameter no smaller than 0.8 nm and no larger than 3.5 nm.

The shell layer should preferably have a thickness no smaller than 0.2 nm and no larger than 10 nm.

The shell layer should preferably have a thickness no smaller than 0.2 nm and no larger than 3 nm.

The shell layer should preferably have a thickness no smaller than 0.2 nm and no larger than 1 nm.

The first material mentioned above should preferably be any metal or alloy thereof which is selected from nickel, copper, palladium, silver, gold, iridium, titanium, iron, cobalt, ruthenium, osmium, chromium, molybdenum, and tungsten.

The second material mentioned above should preferably be any metal which is selected from platinum, nickel, copper, palladium, silver, and gold.

The fine particles of core-shell structure should preferably be formed from the first material which is ruthenium and the second material which is platinum. The resulting fine particles save the amount of platinum required, excel in durability with little degradation, and retain the high catalytic activity for a long period of time.

The functional device according to the present application should preferably be a fuel cell in which the fine particles of core-shell structure are used as catalyst particles for the catalyst-electrode layer. The fuel cell of this type may be provided with the anode catalyst formed from the particles of PtRu core-shell structure. The resulting fuel cell saves the amount of platinum required, excels in durability with little degradation, retains the high catalytic activity for a long period of time, maintains a high output density, and permits cost reduction.

The embodiments will be described below with reference to the accompanying drawings. They are not intended to restrict the scope so long as they produce the above-mentioned effects. Incidentally, the accompanying drawings are designed to help understand the structure easily but are not made to exact scale.

It is assumed in the following description that the monoatomic layer of platinum has a thickness of 0.2265 nm (=d111) calculated from $a0/\sqrt{3}$, where $a0$=0.39231 nm denoting the lattice constant of platinum in the form of simple substance.

Embodiments

<Constitution of Fine Particles of Core-Shell Structure>

The present application covers fine particles of core-shell structure, each particle including a metal core particle (referred to as core particle for short hereinafter) and a shell layer of noble metal such as platinum formed on the surface of the core particle. The fine particles of core-shell structure are suitable for use as the catalyst on the fuel electrode in the fuel cell, the catalyst realizing the high power-generating efficiency.

The fine particles of core-shell structure according to the present application are produced by preparing core particles having the face-centered cubic (fcc) crystal structure and then covering the core particles by epitaxial growth with a material which differs from that constituting the core particles and has the face-centered cubic (fcc) crystal structure thereby forming a shell layer on the surface of the core particles.

The fine particles of core-shell structure according to the present application are of the order of nanometers in size and have their hybrid structure controlled on the atomic scale so that they produce the maximum catalytic activity. In fine particles of the order of nanometers, the atoms in the surface layer account for a large portion of their entire atoms. Such fine particles are expected to create a special state of electrons and hence exhibit a unique electrical property which are not obtained from particles of ordinary size of the order of submicrons.

In the fine particles of core-shell structure according to the present application, each particle is composed of a core particle and a shell layer formed thereon. The core particle is formed from a first material having the face-centered cubic (fcc) crystal structure, and the shell layer is formed from a second material different from the first one having the face-centered cubic (fcc) crystal structure. The shell layer is formed on the core particle by epitaxial growth so that it has the {111} crystal plane of the face-centered cubic (fcc) crystal structure.

According to the present application, the first material for the core particle should preferably be any metal other than noble metals which has the face-centered cubic (fcc) crystal structure, and the second material for the shell layer should preferably be a noble metal which has the face-centered cubic (fcc) crystal structure. The shell layer is formed on the core particle by epitaxial growth so that it has the {111} crystal plane of the face-centered cubic (fcc) crystal structure.

The {111} crystal plane of the face-centered cubic (fcc) crystal structure permits the closest packing of atoms. Therefore, it results in a larger number of atoms appearing on the surface of the shell layer than the plane of amorphous particles, the plane of any other crystal structure, and the crystal plane except for the {111} plane of the crystal of face-centered cubic (fcc) structure. The result is an increased number of atoms involved in catalytic action and an enhanced catalytic activity. This saves the amount of noble metal required for catalyst particles, which leads to cost reduction of fuel cells.

The material for the core particle may be any material which has the face-centered cubic (fcc) crystal structure in its bulk state at normal temperature and normal pressure as well as the hexagonal close packed (hcp) crystal structure or the body-centered cubic (bcc) crystal structure in its bulk state at normal temperature and normal pressure. Examples of the material having the face-centered cubic (fcc) crystal structure include such metals as nickel (Ni), copper (Cu), palladium (Pd), silver (Ag), gold (Au), and iridium (Ir). Examples of the material having the hexagonal close packed (hcp) crystal structure include such metals as titanium (Ti), cobalt (Co), ruthenium (Ru), and osmium (Os). Examples of the material having the body-centered cubic (bcc) crystal structure include such metals as iron (Fe), chromium (Cr), molybdenum (Mo), and tungsten (W). These metals may be used in the form of alloy.

An extreme reduction of particle size causes atoms on the particle surface to account for a large portion in all atoms constituting the particle. This tends to minimize the surface energy of particle relative to the cohesive energy of particle. The result is a possibility of phase transformation from the body-centered cubic (bcc) crystal structure or the hexagonal close packed (hcp) crystal structure, which has a small surface area, into the face-centered cubic (fcc) crystal structure or the closest pack structure, which has a higher atom density per unit volume than the former. (See Non-Patent Document 2.) Examples of such phase transformation at normal temperature and normal pressure include the one from α-Fe, which has the body-centered cubic (bcc) crystal structure, into γ-Fe, which has the face-centered cubic (fcc) crystal structure, and the one from α-Co, which has the hexagonal close packed (hcp) crystal structure, into β-Co, which has the face-centered cubic (fcc) crystal structure.

The foregoing principle is applied to the fine particles of core-shell structure according to the present application. That is, their core particles are prepared by phase transformation from ruthenium having the hexagonal close packed (hcp) crystal structure in bulk form at normal temperature and normal pressure, or from molybdenum or tungsten having the body-centered cubic (bcc) crystal structure in bulk form at normal temperature and normal pressure, into fine particles having the face-centered cubic (fcc) crystal structure.

The shell layer may also be prepared from not only platinum, which has the face-centered cubic (fcc) crystal structure in bulk form at normal temperature and normal pressure, but also any of Ni, Cu, Pd, Ag, and Au. They form the shell layer having the face-centered cubic (fcc) crystal structure by epitaxial growth on the core particles having the face-centered cubic (fcc) crystal structure, as mentioned above.

The shell layer should be composed of particles, each having on its surface at least one {111} crystal plane of the face-centered cubic (fcc) crystal structure, or preferably each having on its entire surface the {111} crystal plane of the face-centered cubic (fcc) crystal structure. The particles constituting the shell layer should preferably be multiply twinned particles of decahedron or dodecahedron.

The multiply twinned particle of decahedron or dodecahedron has the {111} crystal plane which has the highest atom density among the crystal planes of face-centered cubic (fcc) crystal structure. (See Non-Patent Document 1 and Patent Documents 5 and 6.) Consequently, such particles constituting the shell layer have the surface that permits the highest atom density and hence they have the maximum number of atoms contributing to the catalytic action.

The core particle should have an average diameter ranging from 0.8 nm to 10 nm, preferably from 0.8 nm to 5 nm, and more preferably from 0.8 nm to 3.5 nm. The shell layer should have a thickness ranging from about 0.2 nm to 10 nm, preferably from 0.2 nm to 3 nm, and more preferably from 0.2 nm to 1 nm.

<Method for Production of Fine Particles of Core-Shell Structure>

The following description is based on the assumption that the core particles for the fine particles of core-shell structure are formed from ruthenium in the form of simple substance.

A ruthenium salt, such as ruthenium (III) chloride (RuCl3), is dissolved in ethylene glycol to give a solution of ruthenium (III) ions in ethylene glycol. The resulting solution is given an aqueous solution of sodium hydroxide. The resulting mixture is heated to 170° C. with stirring and then kept at 170° C. This heating causes ruthenium (III) ions to be reduced by ethylene glycol, thereby giving a dispersion of ruthenium nanoparticles.

The resulting dispersion is heated to 120 to 170° C. in 1 to 40 minutes by means of a microwave heater or the like to give ruthenium nanoparticles having an average diameter (particle size) of 1.4 to 4.6 nm. For example, heating up to 170° C. in 15 minutes gives ruthenium nanoparticles having an average diameter of 1.9 nm.

(Adsorption of Ruthenium Nanoparticles onto a Carrier)

The dispersion of ruthenium nanoparticles is mixed with carbon black or electrically conductive carbonaceous material as a carrier, so that the ruthenium nanoparticles are adsorbed onto the carrier. The carrier particles supporting the ruthenium nanoparticles are centrifugally separated from the dispersion, followed by washing with deionized water. Subsequently, the ruthenium nanoparticles are coated with a platinum layer as explained below.

(Coating of Ruthenium Nanoparticles with Platinum Layer)

The dispersion of the carrier supporting the ruthenium nanoparticles is given dropwise a solution containing platinum salt such as chloroplatinate or a reducing agent such as sodium tetrahydroborate, so that the surface of the ruthenium nanoparticles is completely coated with a platinum layer. This method permits adequate control over the rate of dropping for the solution of platinum salt and the solution of reducing agent, thereby optimizing the rate of deposition of platinum on the surface of the ruthenium nanoparticles and also controlling the average thickness of the platinum layer.

The rate of dropping of the solution of platinum salt and the solution of reducing agent may be controlled by discharging them from syringes by means of syringe pumps. An excessively high rate of dropping should be avoided. Dropping at an excessively high rate prevents platinum from depositing on the ruthenium particles but causes platinum to separate out without deposition. This is confirmed by observation under an electron microscope. It is necessary to previously establish, by using an electron microscope, an adequate rate of dropping at which platinum deposits on the ruthenium nanoparticles but does not separate out without deposition.

The fine particles of core-shell structure supported on the carrier can be produced by sequential reduction as mentioned above. They can be produced also by simultaneous reduction.

(Method for Determining the Thickness of the Shell Layer or the Number of Layers of Platinum Atoms)

Subsequently, the thus prepared fine particles of core-shell structure are examined for the average thickness of the shell layer by calculating from (R2−R1)/2, where R1 denotes the average diameter of the core particle and R2 denotes the average diameter of the particle of core-shell structure which is equal to the outside diameter of the shell layer. The values of R1 and R2 are obtained from the SEM (Scanning Electron Microscope) image or TEM (Transmission Electron Microscope) image of the particles. The number of layers of platinum atoms is obtained by dividing the average thickness of the platinum layers by the spacing of lattice planes of platinum (d111=0.2265 nm). The respective average diameter of the core particle and the average diameter of the fine particles of core-shell structure are obtained by averaging the major axis and minor axis of the individual particles.

The average thickness of the platinum layer in the shell layer or the number of layers of platinum atoms in the shell layer may also be obtained from the respective average particle diameters of the core particle and the particle of core-shell structure which result from the line analysis by TEM-EDX (Transmission Electron Microscopy-Energy Dispersive X-ray Spectrometry) or SEM-EDX (Scanning Electron Microscopy-Energy Dispersive X-ray Spectrometry) in the direction of the particle diameter of the core particle and the particle of core-shell structure. Incidentally, the respective average diameters of the core particle and the average diameter of the fine particles of core-shell structure are obtained by averaging the major axis and minor axis of the individual particles.

The foregoing description is concerned with the method for production of fine particles of core-shell structure in which the core particles are fine particles of ruthenium. The method mentioned above is also applicable to production of fine particles of core-shell structure in which the core particles are made of any material than ruthenium. The latter method is identical with the former one except that the reactant, solvent, and reaction conditions are changed to prepare core particles, with the main step to prepare the platinum layer remaining unchanged.

[Fuel Cell in which Fine Particles of Core-Shell Structure are Used as Catalyst Particles]

FIG. 1 is a sectional view illustrating the structure of the DMFC pertaining to the embodiment.

The DMFC shown in FIG. 1 works in the following way. The fuel 25, which is methanol in the form of aqueous solution, enters the fuel supplier (or separator) 50 through the inlet 26a and the passage 27a. Then, the fuel 25 passes through the conductive gas diffusion layer 24a (as the substrate) and reaches the catalyst electrode 22a supported by the conductive gas diffusion layer 24a. The methanol reacts with water on the catalyst electrode 22a according to the anode reaction shown at the bottom of FIG. 1. The anode reaction gives rise to hydrogen ions, electrons, and carbon dioxide. The exhaust gas 29a containing carbon dioxide discharges from the outlet 28a.

The resulting hydrogen ions pass through the polymer electrolyte membrane 23, which is formed from a proton-conductive composite electrolyte, and the resulting electrons pass through the gas diffusion layer 24a, the external circuit 70, and the conductive gas diffusion layer 24b which is a substrate in sequential order to reach the catalyst electrode 22b which is held by the gas diffusion layer 24b.

Simultaneously, the DMFC is fed with the air or oxygen 35, which enters the inlet 26b of the air or oxygen supplier (or separator) 60 and flows through the passage 27b. The air or oxygen 35 further passes through the gas diffusion layer 24b to reach the catalyst electrode 22b held by the gas diffusion layer 24b. The hydrogen ions, electrons, and oxygen react with one another on the catalyst electrode 22b according to the cathode reaction shown at the bottom of FIG. 1. The cathode reaction gives rise to water, and the water-containing exhaust gas 29b discharges from the outlet 28b. The overall reaction shown at the bottom of FIG. 1 represents the combustion of methanol with oxygen which generates electrical energy and discharges water and carbon dioxide.

The polymer electrolyte membrane 23 shown in FIG. 1 is made of a proton-conductive electrolyte. It separates the anode 20 and the cathode 30 from each other, and it also permits hydrogen ions and water molecules to pass through. It should preferably be highly capable of conducting hydrogen ions and chemically stable and mechanically strong.

The catalyst electrodes 22a and 22b are the conductive substrates which collect current. They are in close contact with the gas diffusion layers 24a and 24b which are permeable to gas and solution. The gas diffusion layers 24a and 24b are formed from a porous material such as carbon paper, carbon molding, carbon sintered body, sintered metal, and foamed metal. They are made water-repellent by treatment with fluoroplastics so that they do not decrease in gas diffusion efficiency upon contact with water that occurs in the fuel cell during its operation.

Each of the catalyst electrodes 22a and 22b has the carrier which supports the catalyst thereon bonded thereto by the proton conductive polymer electrolyte. Examples of the carrier include carbon, such as acetylene black and graphite, and inorganic fine particles, such as alumina and silica. The catalyst electrodes 22a and 22b in membrane form are formed by coating the gas diffusion layers 24a and 24b with a fluid dispersion of carbon particles (carrying the catalyst metal) in an organic solvent solution containing a proton conductive polymer electrolyte and then evaporating the organic solvent. The proton conductive polymer electrolyte binds the carrier to the gas diffusion layer.

The membrane electrode assembly (MEA) 40 is composed of the polymer electrolyte membrane 23, the catalyst electrodes 22a and 22b placed on the outsides thereof, and the gas diffusion layers 24a and 24b placed on the outsides thereof. The catalyst electrode 22a and the gas diffusion layer 24a constitute the anode 20, and the catalyst electrode 22b and the gas diffusion layer 24b constitute the cathode 30. The catalyst electrodes 22a and 22b are bonded to the polymer electrolyte membrane 23, so that their interfaces keep a high conductivity for hydrogen ions and a low electrical resistance.

The DMFC shown in FIG. 1 is constructed such that the inlet 26a for the fuel 25, the outlet 28a for the exhaust gas 29a, the inlet 26b for the air or oxygen 35, and the outlet 28b for the exhaust gas 29b are perpendicular to the polymer electrolyte membrane 23 and the catalyst electrodes 22a and 22b. However, it may also be constructed in another way such that the above-mentioned openings are parallel to the polymer electrolyte membrane 23 and the catalyst electrodes 22a and 22b. The openings may be variously arranged.

The DMFC shown in FIG. 1 may be produced by any known method disclosed in various literatures. Therefore, its production method is not described in detail.

The following is a description of the example relating to the fine particles of core-shell structure.

EXAMPLES

<Preparation of Fine Particles of PtRu Core-Shell Structure>

The fine particles of core-shell structure according to the present application are produced by the method demonstrated in the examples given below.

(Method for Preparation of Ruthenium Core Particles)

The core particles for the fine particles of core-shell structure were prepared in the following manner. Ruthenium (III) chloride hydrate (RuCl3.nH2O) was dissolved in ethylene glycol to give a solution (190 mL) containing ruthenium (III) ions in an amount of 0.1 mol/L. This solution was given an aqueous solution (10 mL) containing sodium hydroxide (NaOH) in an amount of 0.5 mol/L. The resulting mixed solution was heated to 170° C. in one minute by means of a microwave heater with thorough stirring, and then it was kept at 170° C. for one hour so that the ruthenium (III) ions were reduced by ethylene glycol. Thus there was obtained a dark brown fluid dispersion of ruthenium nanoparticles.

(Adsorption of Ruthenium Nanoparticles onto Carbon Black)

The fluid dispersion obtained as mentioned above was given carbon black (2.88 g) as a carrier, followed by thorough stirring for dispersion. The resulting fluid dispersion was given a solution (100 mL) containing sulfuric acid in an amount of 0.5 mol/L, followed by thorough mixing. The resulting fluid dispersion was centrifuged to separate a mixture of ruthenium nanoparticles and carbon black. After removal of the supernatant liquid, there were obtained ruthenium nanoparticles supported on carbon black.

The ruthenium nanoparticles supported on carbon black were dispersed into deionized water (50 mL) with thorough stirring. They were settled by centrifugation and the supernatant liquid was removed. The precipitates were washed five times for purification and finally dried with nitrogen streams. The thus obtained ruthenium nanoparticles were found to have an average particle diameter of 1.4 nm (with a standard deviation of ±0.3 nm) which was calculated from TEM images.

(Formation of Platinum Layer on Ruthenium Nanoparticles)

The ruthenium nanoparticles supported on carbon black were dispersed into deionized water (200 mL). The resulting fluid dispersion was given dropwise an aqueous solution (6.6 mol/L) of sodium tetrahydroborate ($NaBH_4$) and an aqueous solution (0.97 mol/L) of chloroplatinic acid hexahydrate ($H_2PtCl_6.6H_2O$), so that platinum (IV) ions were reduced to form a platinum layer on the surface of the ruthenium nanoparticles. In this step, the solutions were added dropwise in such an amount that the resulting fine particles of core-shell structure contain platinum and ruthenium in a molar ratio of 3:2.

The composition of the resulting fine particles of core-shell structure was examined for the molar ratio ($\gamma$) of Pt to Ru by ICP (inductively coupled plasma) emission spectrometry. The result indicated that the measured molar ratio coincides with that in the charged materials. In other words, it was found that the metals in the raw materials were converted almost completely into the fine particles of core-shell structure.

The fine particles of core-shell structure which are supported on carbon black were centrifugally separated from the reaction liquid and then washed five times as mentioned above and finally dried with nitrogen streams.

(Measurement of Thickness of Platinum Layer (Shell Layer))

The thus prepared fine particles of core-shell structure were examined by the TEM image for the thickness ($t_s$) of the shell layer by calculation from ($R_2-R_1$)/2, where $R_1$ denotes the average diameter of the core particle which has previously been obtained and $R_2$ denotes the average diameter of the ruthenium nanoparticles of core-shell structure. The number of layers of platinum atoms was obtained by dividing the thickness of the shell layer (platinum layer) by the plane space ($d_{111}$=0.2265 nm) of platinum.

It was found that the fine particles of core-shell structure has an average particle diameter $R_2$=1.9 nm (with a standard deviation of ±0.4 nm). It was also found that the platinum layer has an average thickness ($t_s$) of 0.25 nm (=(1.9−1.4)/2), which was calculated from the average particle diameter of the platinum-containing catalyst particles and the previously obtained average particle diameter ($R_1$=1.4 nm) of the ruthenium nanoparticles. This average thickness of the platinum layer corresponds to 1.1 layers (=0.25/0.2265) of platinum atoms. Thus it was found that the platinum layer includes about one layer of platinum atoms.

(High Resolution HAADF STEM Image of Fine Particles of PtRu Core-Shell Structure)

The fine particles of PtRu core-shell structure according to the example were observed under a high resolution HAADF STEM (High Angle Annular Dark Field Scanning Transmission Electron Microscope). The resulting image and the schematic diagram of atomic arrangement are shown in FIG. 2.

The HAADF STEM image shown in FIG. 2 has the bright spots which represent individual atoms arranged in each fine particle. The image does not distinguish atoms constituting the core from atoms constituting the shell. In other words, it shows that atoms are continuously arranged in one fine particle. This suggests that the shell epitaxially grows from the core. It is to be noted from FIG. 2 that the fine particle of core-shell structure has the regular atomic arrangement of face-centered cubic (fcc) crystal structure which extends from the inside of the particle to the surface of the particle. It is apparent that the fine particle of core-shell structure includes the Ru core particle having the face-centered cubic (fcc) crystal structure and the Pt shell having the face-centered cubic (fcc) crystal structure which has epitaxially grown on the Ru core.

In addition, it is known that the fine particle of core-shell structure is coated with more than one {111} crystal plane of the face-centered cubic (fcc) crystal structure. The fine particle of PtRu core-shell structure shown in FIG. 2 has an average particle diameter of 2.2 nm and also has at least five fcc(111) planes and two fcc(200) planes. Moreover, it is roughly estimated from the particle diameter that one fine particle of PtRu core-shell structure is composed of 300 to 600 atoms.

(High Resolution HAADF Stem Image of Ru Core Fine Particle)

Figure 3:
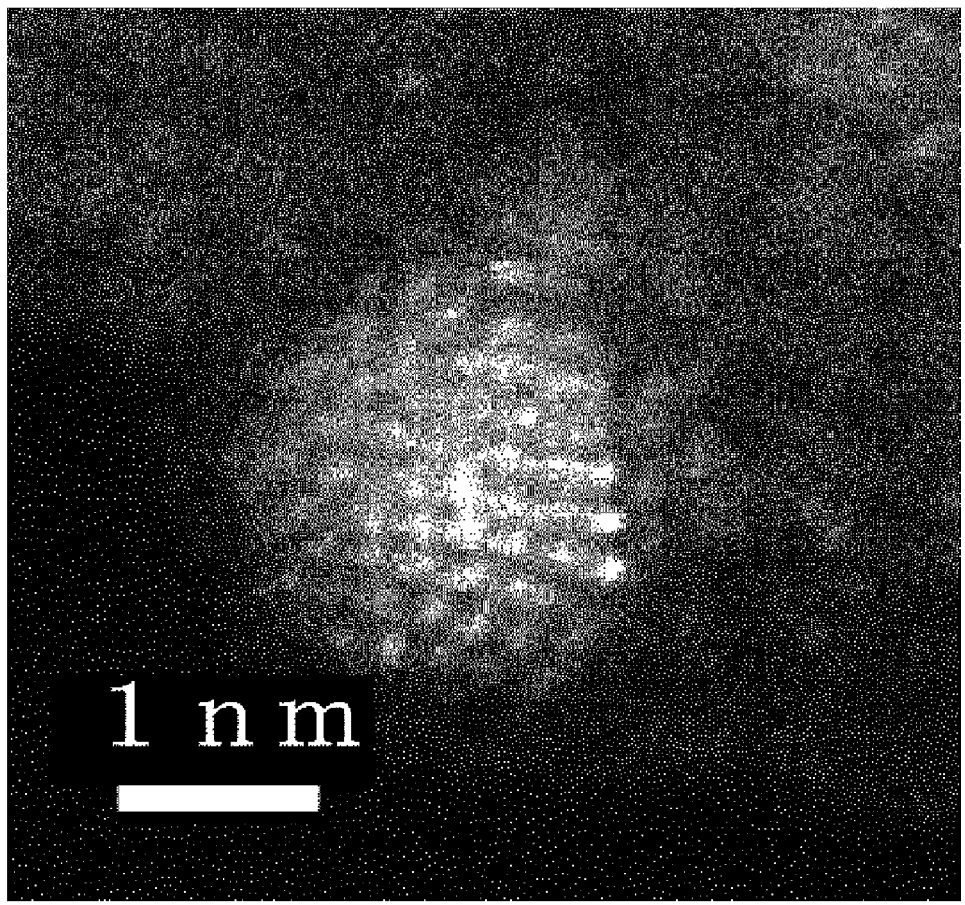
FIG. 3 is a high-resolution HAADF-STEM image of the Ru core fine particle, as above.

The Ru core fine particles according to the example gave a high resolution HAADF STEM image as shown in FIG. 3.

Figure 4:
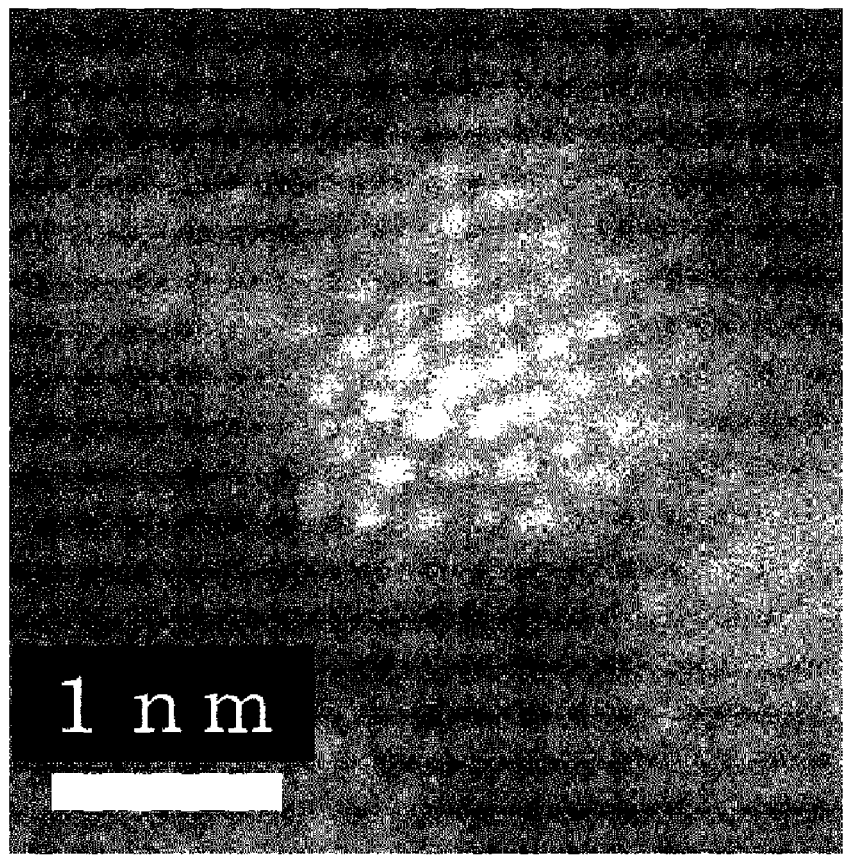
FIG. 4 is a high-resolution HAADF-STEM image of the Ru core fine particle in the form of multiply twinned particle, as above.
Figure 4:
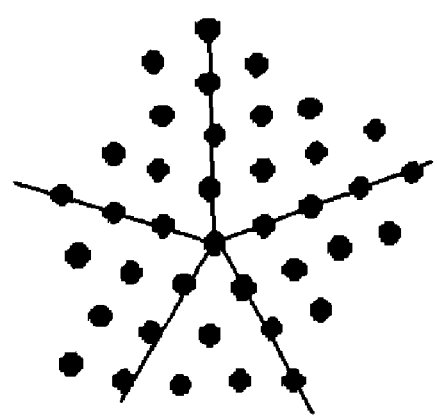

The Ru fine core particle which takes on the form of multiply twinned particle according to the example gave a high resolution HAADF STEM image and a schematic diagram representing atomic arrangement as shown in FIG. 4.

FIG. 3 is a high resolution HAADF STEM image of the Ru core particles taken out after the production of the core particles but before the formation of the shell layer in the course of production of the above-mentioned fine particles of core-shell structure. It is noted from FIG. 3 that the Ru core particle has the face-centered cubic (fcc) crystal structure although it should have the hexagonal close packed (hcp) crystal structure in bulk form at normal temperature and normal pressure.

As in FIG. 3, FIG. 4 also shows a high resolution HAADF STEM image of the Ru core particle. However, the schematic diagram in FIG. 4 suggests that the atomic arrangement of Ru has the five-fold symmetry and the Ru core particle has the face-centered cubic (fcc) crystal structure and forms the multiply twinned particle. The schematic diagram shown in FIG. 4 indicates the twin planes by solid lines. If this Ru core particle is coated with an extremely thin platinum shell including monoatomic layer or diatomic layer, it is possible to form the fine particle of PtRu core-shell structure which is the multiply twinned particle covered only with the {111} plane of the face-centered cubic (fcc) crystal structure. The Ru core fine particle shown in FIGS. 3 and 4 has an average particle diameter of 2.0 nm.

(High Resolution HAADF Stem Images of W Core Fine Particle and Mo Core Fine Particle)

The W core fine particles according to the example gave a high resolution HAADF STEM image as shown in FIG. 5.

The W core fine particles were prepared in the following manner. Tungsten hexacarbonyl ($W(CO)_6$) (0.28 g) was dissolved in oleylamine at 50° C. The resulting solution was heated with thorough stirring up to 170° C. in one minute by means of a microwave heater and then kept at 170° C. for one hour for decomposition of tungsten hexacarbonyl. Thus there was obtained a dark brown fluid dispersion of tungsten nanoparticles.

(Adsorption of Tungsten Nanoparticles onto Carbon Black)

The fluid dispersion obtained as mentioned above was given carbon black (0.15 g) as a carrier, followed by thorough stirring for dispersion. The resulting fluid dispersion was centrifuged to separate a mixture of tungsten nanoparticles and carbon black. After removal of the supernatant liquid, there were obtained tungsten nanoparticles supported on carbon black.

The tungsten nanoparticles supported on carbon black were dispersed into acetone (50 mL) with thorough stirring, and the resulting fluid dispersion was centrifuged for settling. After removal of the supernatant liquid, the tungsten nanoparticles supported on carbon black were washed five times for purification and finally dried with nitrogen streams. The thus obtained tungsten nanoparticles were found to have an average particle diameter of 1.4 nm (with a standard deviation of ±0.3 nm) which was calculated from TEM images.

The Mo core fine particles according to the example gave a high resolution HAADF STEM image as shown in FIG. 6.

The Mo core fine particles were prepared in the following manner. Molybdenum hexacarbonyl ($Mo(CO)_6$) (0.21 g) was dissolved in oleylamine at 50° C. The resulting solution was heated with thorough stirring up to 170° C. in one minute by means of a microwave heater and then kept at 170° C. for one hour for decomposition of molybdenum hexacarbonyl. Thus there was obtained a dark brown fluid dispersion of molybdenum nanoparticles.

(Adsorption of Molybdenum Nanoparticles onto Carbon Black)

The fluid dispersion obtained as mentioned above was given carbon black (0.15 g) as a carrier, followed by thorough stirring for dispersion. The resulting fluid dispersion was centrifuged to separate a mixture of molybdenum nanoparticles and carbon black. After removal of the supernatant liquid, there were obtained molybdenum nanoparticles supported on carbon black.

The molybdenum nanoparticles supported on carbon black were dispersed into acetone (50 mL) with thorough stirring, and the resulting fluid dispersion was centrifuged for settling. After removal of the supernatant liquid, the molybdenum nanoparticles supported on carbon black were washed five times for purification and finally dried with nitrogen streams. The thus obtained molybdenum nanoparticles were found to have an average particle diameter of 1.8 nm (with a standard deviation of ±0.3 nm) which was calculated from TEM images.

FIG. 5 is an HAADF STEM image of W core particles having the body-centered cubic (bcc) crystal structure in bulk form at normal temperature and normal pressure. FIG. 6 is an HAADF STEM image of Mo core particles having the body-centered cubic (bcc) crystal structure in bulk form at normal temperature and normal pressure.

As FIGS. 5 and 6 show, not only the Ru core fine particles, which have the hexagonal close packed (hcp) crystal structure at normal temperature and normal pressure, but also both the W core fine particles and the Mo core fine particles, which have the face-centered cubic (fcc) crystal structure, permit the shell layer having the face-centered cubic (fcc) crystal structure to be formed on the surface thereof, thereby yielding the fine particles of core-shell structure whose surface is the {111} plane of the face-centered cubic (fcc) crystal structure.

<Characteristic Properties of Fuel Cell>

The fine particles of PtRu core-shell structure supported on carbon black were used as the catalyst for the fuel electrode of the direct methanol fuel cell (single unit cell). The resulting fuel cell was examined for characteristic properties.

(Construction of the Fuel Cell)

Figure 7:
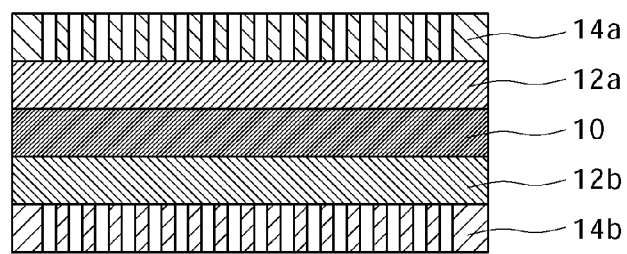
FIG. 7 is a sectional view showing the structure of the fuel cell, as above.

FIG. 7 is a sectional view showing the construction of the MEA (membrane electrode assembly) and its vicinity of the fuel cell according to the example. The fuel cell is identical in basic construction with the one shown in FIG. 1.

The fine particles of PtRu core-shell structure supported on carbon black, which were prepared as mentioned above, were used as the catalyst for the fuel electrode 12a of the direct methanol fuel cell (single unit cell). The resulting fuel cell was examined for characteristic properties.

The fine particles of core-shell structure supported on carbon black were mixed with an aqueous dispersion of Nafion (trademark, from Wako Chemical Inc.) in a ratio of 7:3 by mass. The mixture was made into a properly viscous paste by incorporation with deionized water.

The paste mixture was applied by the doctor blade technique to carbon paper (from Toray Industries, Ltd.) which functions as the gas diffusion layer. After drying, there was obtained the anode catalyst layer. This process was accomplished in such a way that the amount of the fine particles of core-shell structure was 10 mg per square centimeter of the gas diffusion layer 14a. After drying, the coated carbon paper was cut into a square measuring 10 mm by 10 mm. The cut piece was used as the anode (or the fuel electrode 12a).

The cathode was also prepared from a different catalyst material in the same way as the anode except that the catalyst material was changed. First, a platinum catalyst supported on carbon (from Tanaka Kikinzoku Kogyo) was mixed with an aqueous dispersion of Nafion (trademark, from Wako Chemical Ltd.) in a ratio of 7:3 by mass. The mixture was made into a properly viscous paste by incorporation with deionized water.

Next, the paste mixture was applied by the doctor blade technique to carbon paper (from Toray Industries, Inc.) which functions as the gas diffusion layer. After drying, there was obtained the cathode catalyst layer. This process was accomplished in such a way that the amount of platinum was 5 mg per square centimeter of the gas diffusion layer 14b. After drying, the coated carbon paper was cut into a square measuring 10 mm by 10 mm. The cut piece was used as the cathode (or the air electrode 12b).

The fuel electrode 12a and the air electrode 12b were pressed against each other at 150° C. under 1 MPa for 10 minutes, with a membrane of Nafion 112 (trade name, from DuPont) interposed between them, which is a square piece (12 mm by 12 mm) functioning as the proton conducting polymer electrolyte membrane 10. Thus there was obtained the MEA (Membrane Electrode Assembly), in which the fuel electrode 12a and the air electrode 12b face each other and are in contact with the proton conducting polymer electrolyte membrane 10.

For the purpose of comparison, the fuel cell specified below was produced in the same way as in the example, and the resulting fuel cell was examined for characteristic properties.

Comparative Example

The anode catalyst used in Comparative Example was a platinum-ruthenium alloy catalyst supported on carbon (from Tanaka Kikinzoku Kogyo), which contains platinum and ruthenium in a molar ratio of 1:1. This anode catalyst was examined for characteristic properties in the same way as in the example. Incidentally, the platinum-ruthenium alloy catalyst mentioned above was found to be an alloy composed of Pt and Ru in a molar ratio of 1:1, free of core-shell structure, according to analysis of XAFS (X-ray absorption fine structure) obtained from X-ray absorption spectrum of emitted light.

(Evaluation of Performance of Anode Catalyst)

Figure 8:
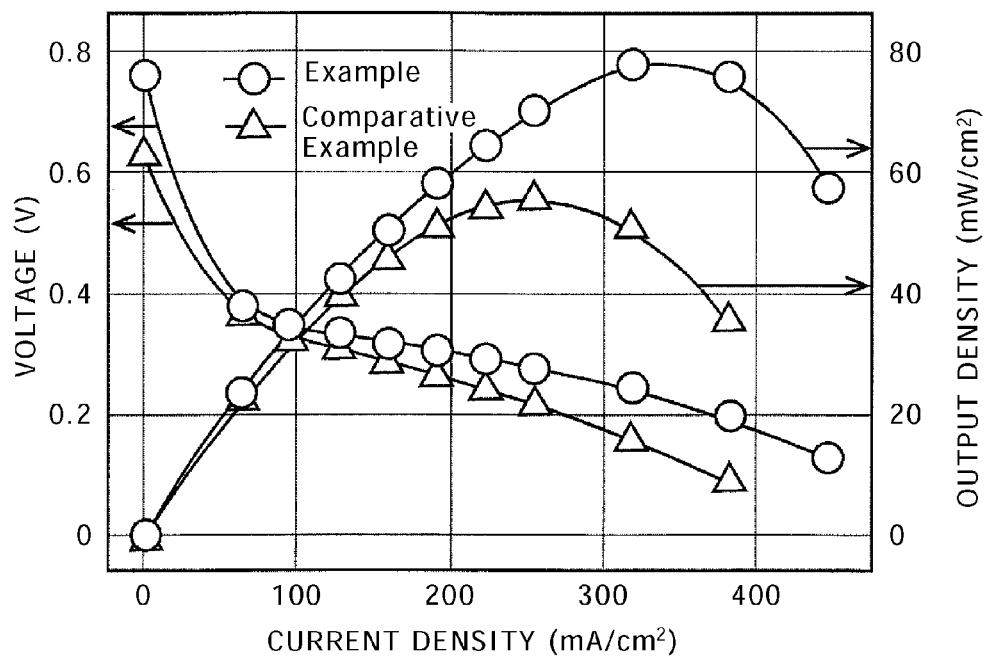
FIG. 8 is a diagram illustrating the power-generating characteristics of the fuel cell, as above.

FIG. 8 is a diagram illustrating the power generating characteristics of the fuel cells according to Example and Comparative Example. In this diagram, the abscissa represents the current density ($mA/cm^2$), the left ordinate represents the cell voltage (V), and the right ordinate represents the output density ($mW/cm^2$).

The fuel cell was allowed to generate electric power at room temperature, with 80 wt % methanol supplied at a constant rate to the anode (fuel electrode 12a). The current density-voltage curve and the current density-output density curve were drawn from the voltage that varies with the varying current value per square centimeter of the electrode.

It is to be noted from FIG. 8 that the fuel cell according to Example gives the maximum output density about 1.4 times larger than that of the fuel cell according to Comparative Example. This proves that power generating characteristics are better with the catalyst of fine particles of PtRu core-shell structure according to Example than with the catalyst of PtRu alloy according to Comparative Example.

The durability or the activity retention of the platinum-containing catalyst is rated in terms of output retention, which is the ratio of the output voltage after a certain period of time to the initial output voltage. The output retention indicates the change in catalytic activity after power generation for a long period of time as compared with the initial catalytic activity. It denotes the retention of catalytic activity. Therefore, it permits the anode catalyst or the catalyst of particles of PtRu core-shell structure to be examined for durability.

The fuel cell was run continuously for 800 hours to generate a constant current of 100 mA per square centimeter of the electrode. The output retention was calculated by comparing the degraded output with the initial output. The fuel cell (DMFC) was found to have the output retention of 92.3% and 73.0%, respectively, in Example and Comparative Example. A probable reason for the difference in output retention is that the anode catalyst in Comparative Example is based on platinum-ruthenium alloy whereas the anode catalyst in Example is based on fine particles of PtRu core-shell structure. In the former case, the catalyst particles bear much ruthenium on their surface which dissolves to greatly deteriorate the catalyst performance. By contrast, in the latter case, the ruthenium fine particles are completely coated with the platinum layer which prevents the dissolution of ruthenium.

The direct methanol fuel cell in Example is provided with the anode catalyst based on fine particles of PtRu core-shell structure and hence is excellent in durability with a high output density and output retention. Therefore, it saves platinum consumption, excels in durability with little deterioration, retains a high catalytic activity and output for a long period of time, and permits cost reduction.

The foregoing description is concerned solely with the particles of PtRu core-shell structure as the fine particles of core-shell structure to be used for the catalyst of fuel cells.

However, the fine particles of core-shell structure according to the present application will find use not only in fuel cells but also in other energy devices and functional devices such as light-emitting devices.

The nanoparticles of core-shell structure according to the present application save the amount of expensive rare metal (such as platinum) to be used for the shell layer. They permit the rare metal layer to be used as the reaction catalyst layer or the metal electrode.

The nanoparticles of core-shell structure in which the shell layer is formed from rare metal such as platinum can be used as the catalyst for treatment of automobile exhaust gas or as a substitute for a variety of metal catalysts including nanoparticles. For example, they may be applied to the anodes and cathodes for organic EL elements, organic transistors, and organic image sensors, and the metal electrodes for electric devices (or functional devices) such as silicon semiconductors, GaAs and GaN lasers, and LEDs. They may be used also as the electrode current collector of the lithium ion secondary battery.

The application has been described above with reference to Example and Comparative Example. It is not restricted to them in its scope, but it may be variously modified on the basis of its technical idea.

The present application provides the fine particles of core-shell structure that can be applied to the anode catalyst of fuel cells, and it also provides the functional device incorporated with them.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. Fine particles having a core-shell structure, each particle comprising a core particle having an average diameter no smaller than 0.8 nm and no larger than 5 nm, which is formed from a first material and has a face-centered cubic crystal structure and a shell layer which is formed from a second material differing from said first material on the surface of said core particle and has the face-centered cubic crystal structure, said fine particles containing particles which are multiply twinned fine particles and are surrounded by a {111} crystal plane.

2. The fine particles having a core-shell structure as defined in claim 1, wherein the core particle has an average diameter no smaller than 0.8 nm and no larger than 3.5 nm.

3. The fine particles having a core-shell structure as defined in claim 1, wherein the shell layer has a thickness no smaller than 0.2 nm and no larger than 10 nm.

4. The fine particles having a core-shell structure as defined in claim 1, wherein the shell layer has a thickness no smaller than 0.2 nm and no larger than 3 nm.

5. The fine particles having a core-shell structure as defined in claim 1, wherein the shell layer has a thickness no smaller than 0.2 nm and no larger than 1 nm.

6. The fine particles having a core-shell structure as defined in claim 1, wherein the first material is a metal or alloy thereof selected from the group consisting of nickel, copper, palladium, silver, gold, iridium, titanium, iron, cobalt, ruthenium, osmium, chromium, molybdenum, and tungsten.

7. The fine particles having a core-shell structure as defined in claim 1, wherein the second material is a metal selected from the group consisting of platinum, nickel, copper, palladium, silver, and gold.

8. The fine particles having a core-shell structure as defined in claim 1, wherein the first material is ruthenium and the second material is platinum.

9. A functional device comprised of fine particles having a core-shell structure, each particle being composed of a core particle having an average diameter no smaller than 0.8 nm and no larger than 5 nm which is formed from a first material and has a face-centered cubic crystal structure and a shell layer which is formed from a second material differing from said first material on the surface of said core particle and has the face-centered cubic crystal structure, said fine particles containing particles which are multiply twinned fine particles and are surrounded by a {111} crystal plane.

10. The functional device as defined in claim 9 wherein the device is a fuel cell in which the fine particles having a core-shell structure are used as catalyst particles for a catalyst electrode layer.

* * * * *